US008867814B2

(12) United States Patent
Lonn et al.

(10) Patent No.: US 8,867,814 B2
(45) Date of Patent: Oct. 21, 2014

(54) METHODS AND SYSTEMS FOR GENERATING A POSITRON EMISSION TOMOGRAPHY ATTENUATION CORRECTION MAP

(71) Applicant: General Electric Company, Schenectady, NY (US)

(72) Inventors: Albert Henry Roger Lonn, Chalfont St Giles (GB); Scott David Wollenweber, Waukesha, WI (US); Dattesh Dayanand Shanbhag, Bangalore (IN); Sheshadri Thiruvenkadam, Bangalore Karnataka (IN)

(73) Assignee: General Electric Company, Schenectady, NY (US)

( * ) Notice: Subject to any disclaimer, the term of this patent is extended or adjusted under 35 U.S.C. 154(b) by 58 days.

(21) Appl. No.: 13/644,916

(22) Filed: Oct. 4, 2012

(65) Prior Publication Data
US 2014/0099009 A1    Apr. 10, 2014

(51) Int. Cl.
*G06K 9/00* (2006.01)
(52) U.S. Cl.
USPC ......................................... 382/131; 382/128
(58) Field of Classification Search
None
See application file for complete search history.

(56) References Cited

U.S. PATENT DOCUMENTS

| 6,140,649 | A | 10/2000 | Lonn | |
| 6,317,509 | B1 * | 11/2001 | Simanovsky et al. | 382/131 |
| 734,856 | A1 | 3/2008 | Wollenweber et al | |
| 781,378 | A1 | 10/2010 | Thomas et al. | |
| 8,165,385 | B2 * | 4/2012 | Reeves et al. | 382/154 |
| 2009/0129652 | A1 * | 5/2009 | Zwirn et al. | 382/131 |
| 2009/0161933 | A1 * | 6/2009 | Chen | 382/131 |
| 2010/0007346 | A1 * | 1/2010 | Ladebeck | 324/307 |
| 2010/0067765 | A1 * | 3/2010 | Buther et al. | 382/131 |
| 2010/0272342 | A1 * | 10/2010 | Berman et al. | 382/131 |
| 2011/0129057 | A1 * | 6/2011 | Paul et al. | 378/4 |
| 2011/0148861 | A1 * | 6/2011 | Boellaard | 345/419 |
| 2011/0164801 | A1 * | 7/2011 | Gagnon et al. | 382/131 |

OTHER PUBLICATIONS

"Automatic, three segment, MR-based attenuation correction for whole-body PET/MR data", V. Schulz et al, Eur J Nucl Med Mol Imaging (2011) 38:138-152.
"Tissue Classification as a Potential Approach for Attenuation Correction in Whole-Body PET/MRI: Evaluation with PET/CT Data", Axel Martinex-Moller et al, J Nucl Med 2009; 50: 520-526.

* cited by examiner

*Primary Examiner* — Avinash J Yentrapati
(74) *Attorney, Agent, or Firm* — Dean D. Small; The Small Patent Law Group

(57) ABSTRACT

A method for generating a positron emission tomography (PET) attenuation correction map. The method includes obtaining a magnetic resonance (MR) image dataset of a subject of interest, obtaining a positron emission tomography (PET) emission dataset of the subject of interest, segmenting the MR image dataset to identify at least one object of interest, determining a volume of the object of interest, and generating a PET attenuation correction map using the determined volume. A medical imaging system and a non-transitory computer readable medium are also described herein.

20 Claims, 6 Drawing Sheets

METHODS AND SYSTEMS FOR GENERATING A POSITRON EMISSION TOMOGRAPHY ATTENUATION CORRECTION MAP

BACKGROUND OF THE INVENTION

The subject matter disclosed herein relates generally to imaging systems, and more particularly to methods and systems for generating a Positron Emission Tomography (PET) attenuation correction map.

Multi-modality imaging systems exist that scan using different modalities, for example, Computed Tomography (CT), Magnetic Resonance Imaging (MRI), Positron Emission Tomography (PET), and Single Photon Emission Computed Tomography (SPECT). For example, one known multi-modality imaging system includes a PET imaging system and a CT imaging system. In operation, PET and CT information is acquired from the PET and CT and imaging systems, respectively. The acquired PET and CT information is then processed to reconstruct a set of PET images, a set of CT images, and/or a set of fused PET/CT images.

In a PET/CT system, the PET images are typically reconstructed using attenuation correction. For example, information generated by the CT system may be utilized to generate a set of attenuation correction factors that may be applied, to the PET images. In general, the attenuation correction factors correlate to a density of the object being imaged. Accordingly a plurality of attenuation correction factors may, for example, be derived from CT density information that is generated during a CT scan, wherein the CT system is specifically configured to generate density information that may be utilized to generate the attenuation correction factors. Thus, in a PET/CT imaging system, the density information may be acquired directly from the CT information to generate an attenuation correction map which may then be applied to attenuation correct the PET data.

Multi-modality imaging systems may also be configured as a PET/MR imaging system. However, if the multi-modality imaging system is configured as a PET/MR system, the MR information cannot be directly used to estimate the attenuation correction factors to reconstruct a PET image. More specifically, the information in an MR image is generally not directly related to density. Therefore, the MR information cannot be used directly to generate an attenuation correction map for attenuation correcting PET data.

BRIEF DESCRIPTION OF THE INVENTION

In one embodiment, a method for generating a positron emission tomography (PET) attenuation correction map is provided. The method includes obtaining a magnetic resonance (MR) image dataset of a subject of interest, obtaining a positron emission tomography (PET) emission dataset of the subject of interest, segmenting the MR image dataset to identify at least one object of interest, determining a volume of the object of interest, and generating a PET attenuation correction map using the determined volume.

In another embodiment, a medical imaging system is provided. The medical imaging system includes a magnetic resonance imaging (MRI) system, a positron emission tomography (PET) imaging system, and a computer coupled to the MRI system and the PET system. The computer is programmed to obtain a magnetic resonance (MR) image dataset of a subject of interest, obtain a positron emission tomography (PET) emission dataset of the subject of interest, segment the MR image dataset to identify at least one object of interest, determine a volume of the object of interest, and generate a PET attenuation correction map using the determined volume.

In a further embodiment, a non-transitory computer readable medium is provided. The non-transitory computer readable medium encoded with a program programmed to instruct a computer to obtain a magnetic resonance (MR) image dataset of a subject of interest, obtain a positron emission tomography (PET) emission dataset of the subject of interest, segment the MR image dataset to identify at least one lung, determine a volume of the lung, and generate a PET attenuation correction map using the determined volume.

DETAILED DESCRIPTION OF THE INVENTION

Figure 1:
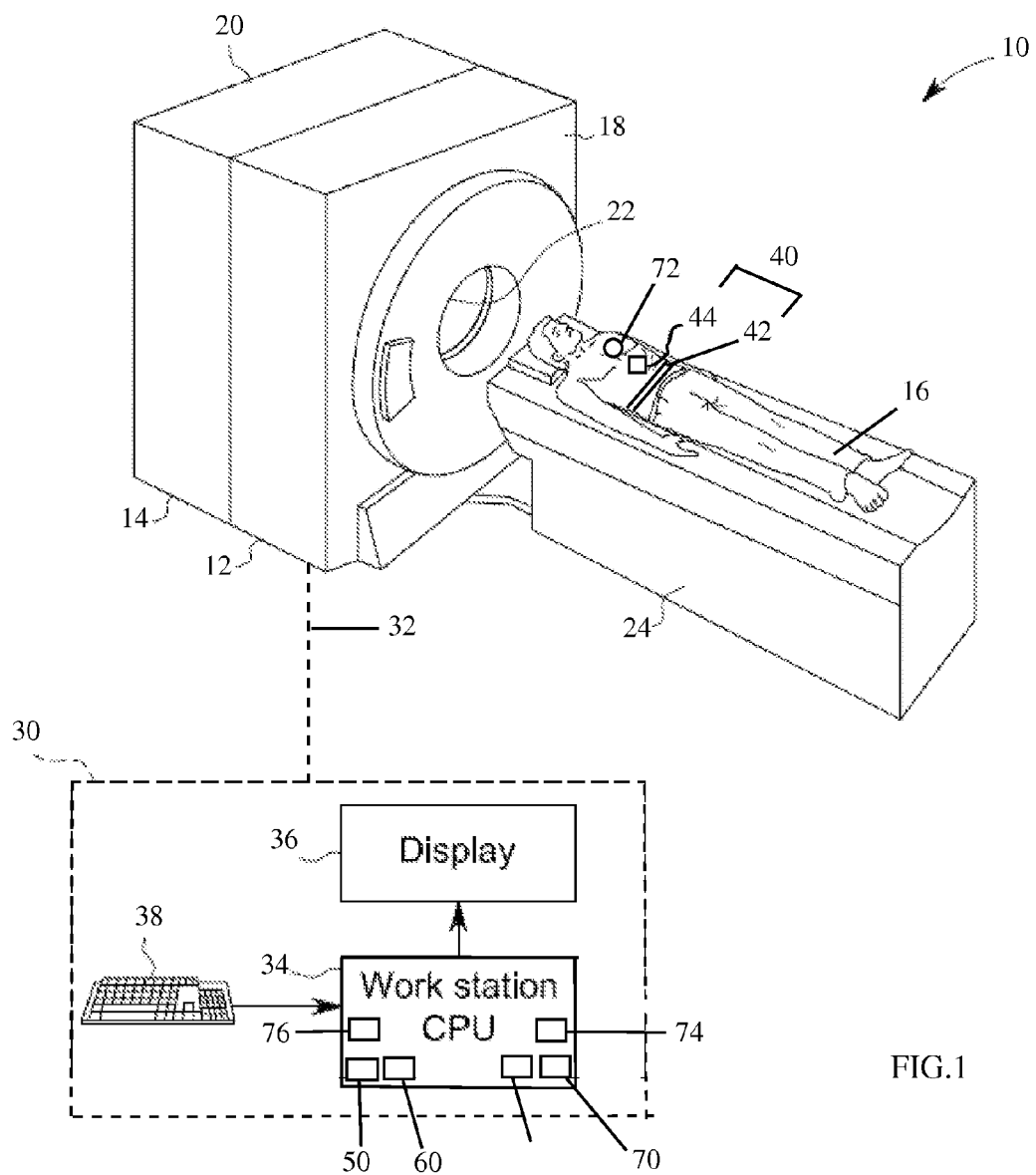
FIG. 1 is a diagram of an exemplary imaging system formed in accordance with various embodiments.

The foregoing summary, as well as the following detailed description of various embodiments, will be better understood when read in conjunction with the appended drawings. To the extent that the figures illustrate diagrams of the functional blocks of the various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like) or multiple pieces of hardware. Similarly, the programs may be stand-alone programs, may be incorporated as subroutines in an operating system, may be functions in an installed software package, and the like. It should be understood that the various embodiments are not limited to the arrangements and instrumentation shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Also as used herein, the phrase "reconstructing an image" is not intended to exclude embodiments of the present invention in which data representing an image is generated, but a viewable image is not. Therefore, as used herein the term "image" broadly refers to both viewable images and data representing a viewable image. However, many embodiments generate, or are configured to generate, at least one viewable image.

Various embodiments described herein provide an imaging system 10 as shown in FIG. 1. In various embodiments, the imaging system 10 is a multi-modality imaging system that includes different types of medical imaging systems, such as a Positron Emission Tomography (PET), a Single Photon Emission Computed Tomography (SPECT), a Computed Tomography (CT), an ultrasound system, a Magnetic Resonance Imaging (MRI) or any other system capable of generating diagnostic images. In the illustrated embodiment, the imaging system 10 is a PET/MRI system. It should be realized that the various embodiments are not limited to multi-modality medical imaging systems, but may be used on a single modality medical imaging system such as a stand-alone PET imaging system or a stand-alone MRI system, for example. Moreover, the various embodiments are not limited to medical imaging systems for imaging human subjects, but may include veterinary or non-medical systems for imaging non-human objects, etc.

Referring to FIG. 1, the multi-modality imaging system 10 includes a first modality unit 12 and a second modality unit 14. The two modality units enable the multi-modality imaging system 10 to scan an object or subject 16 in a first modality using the first modality unit 12 and to scan the subject 16 in a second modality using the second modality unit 14. The multi-modality imaging system 10 allows for multiple scans in different modalities to facilitate an increased diagnostic capability over single modality systems. In the illustrated embodiment, the first modality 12 is a PET imaging system and the second modality 14 is a MRI system. The imaging system 10 is shown as including a gantry 18 that is associated with the PET imaging system 12 and a gantry 20 that is associated with the MRI system 14. During operation, the subject 16 is positioned within a central opening 22, defined through the imaging system 10, using, for example, a motorized table 24.

The imaging system 10 also includes an operator workstation 30. During operation, the motorized table 24 moves the subject 16 into the central opening 22 of the gantry 18 and/or 20 in response to one or more commands received from the operator workstation 30. The workstation 30 then operates the first and/or second modalities 12 and 14 to both scan the subject 16 and to acquire emission data and/or MRI data of the subject 16. The workstation 30 may be embodied as a personal computer (PC) that is positioned near the imaging system 10 and hard-wired to the imaging system 10 via a communication link 32. The workstation 30 may also be embodied as a portable computer such as a laptop computer or a hand-held computer that transmits information to, and receives information from the imaging system 10. Optionally, the communication link 32 may be a wireless communication link that enables information to be transmitted to and/or from the workstation 30 to the imaging system 10 wirelessly. In operation, the workstation 30 is configured to control the operation of the imaging system 10 in real-time. The workstation 30 is also programmed to perform medical image diagnostic acquisition and reconstruction processes described herein.

The operator workstation 30 includes a central processing unit (CPU) or computer 34, a display 36, and an input device 38. As used herein, the term "computer" may include any processor-based or microprocessor-based system including systems using microcontrollers, reduced instruction set computers (RISC), application specific integrated circuits (ASICs), field programmable gate array (FPGAs), logic circuits, and any other circuit or processor capable of executing the functions described herein. The above examples are exemplary only, and are thus not intended to limit in any way the definition and/or meaning of the term "computer". In the exemplary embodiment, the computer 34 executes a set of instructions that are stored in one or more storage elements or memories, in order to process information received from the first and second modalities 12 and 14. The storage elements may also store data or other information as desired or needed. The storage element may be in the form of an information source or a physical memory element located within the computer 34.

The imaging system 10 may also include at least one respiratory sensor 40 that is adapted to detect and transmit information that is indicative of the respiratory cycle of the subject 16. In one embodiment, the respiratory sensor 40 may be embodied as a belt-type respiratory sensor 42 that is adapted to extend at least partially around the subject 16. Optionally, the respiratory sensor 40 may be embodied as a respiratory sensor 44 that is adapted to be secured to a predetermined position on the subject 16. It should be realized that although two different respiratory sensors 40 are described, the imaging system 10 may include other types of respiratory sensors 40 to generate respiratory related information of the subject 16.

The imaging system 10 also includes an attenuation correction module 50 that is configured to implement various methods described herein. In some embodiments, the attenuation correction module 50 is configured to perform MR-based attenuation correction of 511 keV PET data. However, it should be realized the PET data may be acquired at energy levels other than 511 keV and that the energy level of 511 keV is exemplary only. In various embodiments, the attenuation correction module 50 is configured to acquire an MR dataset and a PET dataset, identify an organ of interest within the MR dataset, determine a volume of the organ of interest, and utilize the determined volume to generate a set of attenuation correction factors, also referred to herein as an attenuation correction map, which may be utilized to attenuation correct the PET data as is described in more detail below.

The attenuation correction module 50 may be implemented as a piece of hardware that is installed in the computer 34. Optionally, the attenuation correction module 50 may be implemented as a set of instructions that are installed on the computer 34. Moreover, the set of instructions may be stored on a non-transitory computer readable medium that is configured to be utilized by the computer 34. The set of instructions may be stand-alone programs, may be incorporated as subroutines in an operating system installed on the computer 34, may be functions in an installed software package on the computer 34, and the like. It should be understood that the various embodiments are not limited to the arrangements and instrumentation shown in the drawings.

The set of instructions may include various commands that instruct the computer 34 as a processing machine to perform specific operations such as the methods and processes of the various embodiments described herein. The set of instructions may be in the form of a software program or the non-transitory computer readable medium. As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

Figure 2:
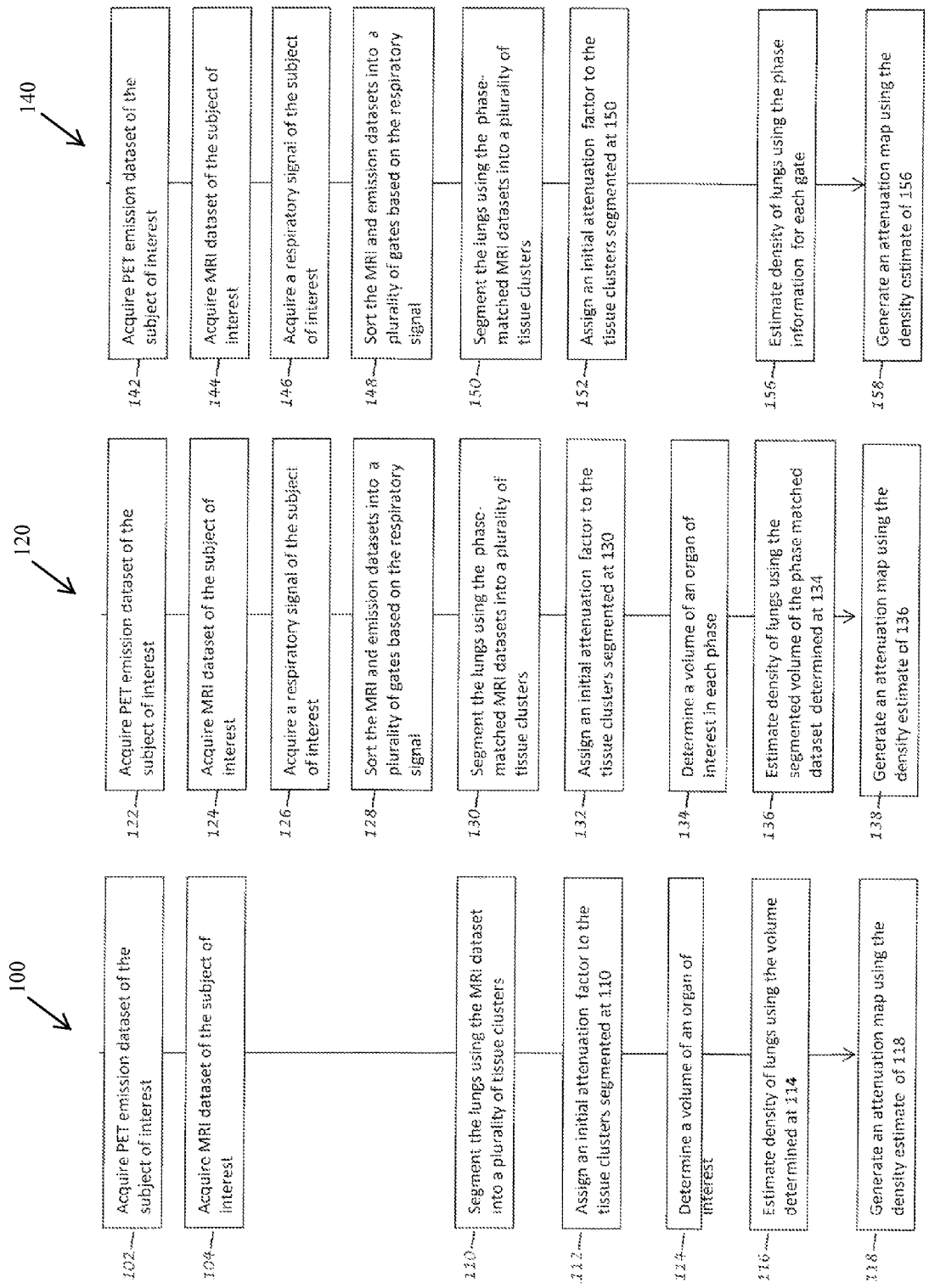
FIG. 2 is a flowchart illustrating methods for attenuation correcting PET emission data in accordance with various embodiments.

FIG. 2 illustrates the flowcharts of three exemplary methods 100, 120, 140 for utilizing MR information to generate an attenuation correction map for attenuation correcting PET emission data. In various embodiments, the methods in FIG. 2 may be implemented using for example, the computer 34 and/or the attenuation correction module 50.

In FIG. 2 at 102, 122, and 142, a PET emission dataset 60 (shown in FIG. 1) is acquired using, for example, the PET system 12 shown in FIG. 1. The emission dataset 60 may be obtained by performing a scan of the subject 16 to produce the emission dataset 60. Optionally, the emission dataset 60 may be obtained from data collected during a previous scan of the subject 16, wherein the emission dataset 60 has been stored in a memory device, such as a memory device 70 (shown in FIG. 1). The emission dataset 60 may be stored in any format. The PET emission dataset 60 may be obtained during real-time scanning of the subject 16. For example, the methods described herein may be performed on emission data as the emission dataset 60 is received from the PET system 12 during a real-time examination of the subject 16.

At 104, 124, and 144, an MR image dataset 62 (shown in FIG. 1) is acquired using, for example, the MRI system 14 shown in FIG. 1. The MR image dataset 62 may be obtained by performing a scan of the subject 16 to produce the MR image dataset 62. Optionally, the MR image dataset 62 may be obtained from data collected during a previous scan of the subject 16, wherein the MR image dataset 62 has been stored in a memory device, such as the memory device 70 (shown in FIG. 1). The MR image dataset 62 may be stored in any suitable format. The MR image dataset 62 may be obtained during real-time scanning of the subject 16. For example, the methods described herein may be performed on MRI data as the MR image dataset 62 is received from the MRI system 14 during a real-time examination of the subject 16.

In various embodiments, the emission dataset 60 and the MR image dataset 62 include information relating to at least one organ or object of interest 72 (shown in FIG. 1). For example, in various embodiments described herein, the organ of interest 72 is the subjects' 16 lungs. However, it should be realized that the methods described herein may be implemented for organs or objects other than the lungs and that while various embodiments are described with respect to the subject's 16 lungs, the lungs are exemplary only. In the illustrated embodiment, the emission dataset 60 and the MR image dataset 62 are acquired during the imaging scan of the subject 16.

During acquisition of the emission dataset 60 and the MR image dataset 62, the subject 16 breathes in, i.e. the inspiration phase, causing the lungs to expand. Conversely, when the subject 16 breathes out, i.e. the expiration phase, the lungs contract. Accordingly, in various embodiments, the methods 100, 120, and 140 shown in FIG. 2 facilitate matching the inspiration level in the emission dataset 60 with the inspiration level in the MR image dataset 62 by monitoring and controlling the patient respiratory phase.

Figure 3:
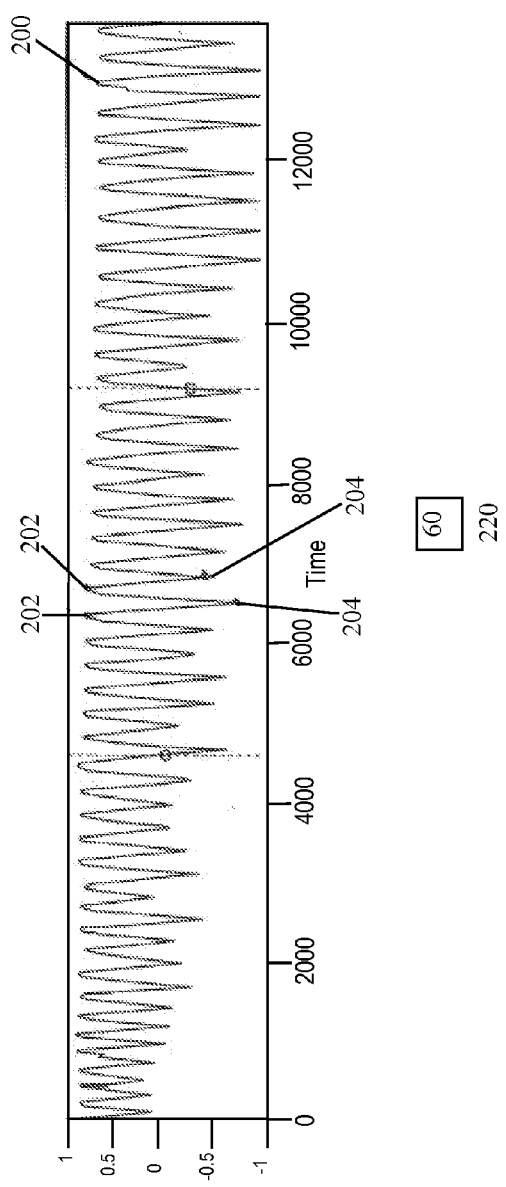
FIG. 3 is a respiratory signal that may be generated in accordance with various embodiments.

For example, in the method 100, the PET emission dataset 60 and the MR image dataset 62 are acquired at similar levels of inspiration which may be obtained, for example, by having the subject 16 undergo either inspiration breath-hold, expiration breath-hold or shallow breathing. In various other embodiments, a respiratory signal may be utilized to match the respiratory phase of the PET emission dataset 60 and the MR image dataset 62. For example, at step 126 in method 120 and at step 146 in method 140 a motion or respiratory signal is acquired. The respiratory signal may be acquired, for example, using the respiratory sensor 40 (shown in FIG. 1). In operation, the respiratory sensor 40 (e.g. the motion sensor) generates a signal, for example a respiratory signal or trace 200 (shown in FIG. 3), which is representative of the respiratory motion of the subject 16 during the process of acquiring the emission dataset 60 and the MR image dataset 62 as described above. Accordingly, the respiratory signal 200 includes a plurality of peaks 202 that, in various embodiments, represent a point wherein the subject's 16 breathing is at maximum point of inspiration in the respiratory cycle. Moreover, the respiratory signal 200 includes a plurality of valleys 204 that, in various embodiments, represent a point wherein the subject's 16 breathing is at maximum point of expiration in the respiratory cycle. Accordingly, the respiratory signal 200 may be utilized to provide information that indicates whether the subject 16 is at an inspiration point, an expiration point, or between the inspiration and expiration points in a breathing cycle.

Figure 4:
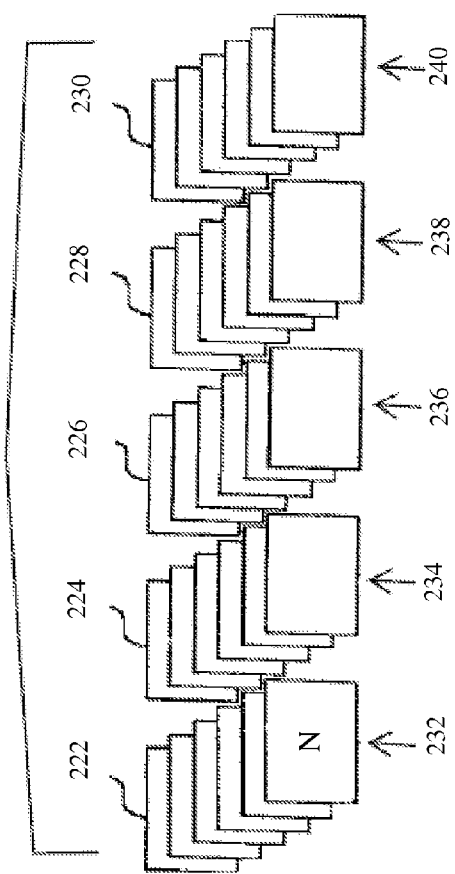
FIG. 4 is a block diagram of a plurality of gates that may be generated in accordance with various embodiments.

Referring again to FIG. 2, and specifically to methods 120 and 140 wherein a respiratory signal has been acquired, at 128 and 148, the emission dataset 60 and the MR image dataset 62 are sorted into a plurality of bins or gates 220 based on the respirator signal acquired at 126 and 146, respectively. For example, FIG. 4 is a simplified block diagram illustrating a plurality of gates 220 numbered 222, 224, 226, 228, and 230, i.e. n=5 gates. Thus, in the illustrated embodiment, the emission dataset 60 is sorted into the five gates. However, it should be realized that the quantity of gates 220 illustrated in FIG. 4 is exemplary, and that during operation, fewer than five gates 220 or more than five gates 220 may be utilized. As such, in the illustrated embodiment, each of the gates 222, 224, 226, 228, and 230 includes approximately ⅕ of the total emission dataset 60.

More specifically, assume that the total length of the emission dataset 60 obtained at 122 or 142 is three minutes. Moreover, assume that the emission dataset 60 is sorted into five gates 220. Accordingly, each respective gate 220 includes approximately thirty-six seconds of information. Thus, a first portion 232 of the emission dataset 60 is sorted into the gate 222, a second portion 234 of the emission dataset 60 is sorted into the gate 224, a third portion 236 of the emission dataset 60 is sorted into the gate 226, a fourth portion 238 of the emission dataset 60 is sorted into the gate 228, and a fifth portion 240 of the emission dataset 60 is sorted into the gate 230.

In the steps 128 and 148, the emission dataset 60 is sorted into a respective gate 220 based on the respiratory information obtained of the subject 14. Information to determine the respiratory state of the subject 16 may be acquired from, for example, the motion sensor 40 as described above. In operation, the gate 222 may include emission data acquired at the beginning of a respiration phase and the gate 230 may include emission data acquired at the end of the respiration phase. Moreover, each intervening gate, i.e. the gates 224, 226, and 228 may include emission data that represents a motion state between inspiration and expiration. More specifically, each of the gates 220 is adapted to receive emission data that was acquired over a plurality of breathing cycles. Accordingly, each of the gates 220 is adapted to receive emission data that represents approximately the same point in the patient's breathing cycle. As a result, each of the gates 220 includes emission data representing a certain respiratory state of the subject 16. In other words, when an organ having a more or less periodical motion, such as the lungs, is imaged, the emission data 60 is rearranged such that emission data acquired at a similar respiratory phase are sorted into the same temporal gate. As described above, the decision as to which gate 220 an event belongs may be made on the basis of information acquired using the respiratory sensor 40.

Referring again to FIG. 2, at 110, 130 150 at least one object in the MR image dataset 62 is segmented. More specifically, the information representing the lungs has a different value than other surrounding organs, tissue, bone, and/or air. Accordingly, in various embodiments, to identify the lungs, the MR image dataset 62 is segmented. In some embodiments, a segmentation algorithm, which may be installed on the attenuation correction module 50, is configured to locate the object of interest 72, such as the lungs, and separate image data of the lungs from image data of surrounding objects of lesser or no interest.

The segmentation algorithm uses a principle, whereby it is generally assumed that the lungs may be differentiated from other anatomical features by clustering the various tissue types together either using MR images reconstructed from the MR image dataset 62, or the MR image dataset 62, itself. The segmentation may be implemented using various thresholding and edge detection techniques which initially identify an outline of the subject's 16 body and then identify the fat, muscle, bones, lungs, etc. Thus, the result of the segmentation performed at 110, 130 150 is an MR image or MR image dataset wherein the information representing the lungs are clustered together, and the tissues types representing other organs, air, bone, etc. are clustered together. Accordingly, at 110, 130, and 150 the lungs are segmented from the surrounding tissue. It should be realized that in various other embodiments, the emission dataset 60 may also be utilized to segment the lungs.

At 112, 132, and 152 an initial attenuation correction value is assigned to each cluster identified during the segmentation process of 110, 130, and 150. For example, assume that five different clusters are identified during the segmentation process of 110, 130, and 150. The five clusters may include, for example, bones, air, fat, lungs and remaining soft tissue including muscle, kidney, liver and brain. Thus, in various embodiments, each of the five clusters is assigned a different initial attenuation correction factor. In various embodiments, the initial attenuation correction value may be based on a priori knowledge of the various organs. For example, it may be known that a linear attenuation of fat at 511 keV is for example, approximately 0.09 cm$^{-1}$. Accordingly, each voxel in the clusters identified as fat may be assigned an initial attenuation correction factor of 0.09. Similarly, the dense bones may be assigned an initial attenuation correction factor of 0.015, the air may be assigned an initial attenuation correction factor of 0, the lungs may be assigned an initial attenuation correction factor of 0.025 and the remaining soft tissue may be assigned an initial attenuation correction factor of 0.099 cm$^{-1}$ Optionally, the various tissues may be identified using any arbitrary number that enables the user or module 50 to distinguish clusters or volumes that represent various tissue types. Moreover, it should be realized that the lung segmentation may be performed using the emission dataset 60.

As described above, the methods 100, 120, 140 are utilized to generate an attenuation correction map using the MR image dataset 62 to attenuation correct PET images generated using the emission dataset 60. It should therefore be realized that in some imaging situations, the initial attenuation correction values assigned at 110, 130, and 150 may not provide the optimal attenuation correction for each of the tissue clusters in the PET images. For example, as explained above, to generate the emission data 60 and the MR image data 62, the patient is typically breathing during the scanning procedure. As a result, various organs are typically moving during the scanning procedure. While patient motion may have little or no effect on the attenuation correction factor assigned to uniform tissue clusters, the patient motion may result in the initial attenuation correction factor being less than optimal for attenuation correcting at least some of the organs being reconstructed in the PET images.

For example, as the subject 16 breathes in, i.e. the inspiration phase, the lungs expand. Conversely, when the subject 16 breathes out, i.e. the expiration phase, the lungs contract. Moreover, as the lungs expand the net density of the lung tissue decreases. Whereas, when the lungs contract, the net density of the lungs increases. Thus, the lungs are a large organ having a large volume that varies over the respiratory cycle. In various embodiments, the density of the lungs also varies over the respiratory cycle. Accordingly, it is desirable to determine where the lungs are in the respiratory cycle to provide a more accurate attenuation correction factor for the lungs to be utilized to attenuation correct the PET images. Accordingly, because the MR image dataset cannot be used directly to determine density, information on the respiratory cycle is utilized to determine lung density as described in more detail below.

Referring again to FIG. 2, at 114 and 134, in methods 100 and 120, respectively, a volume of the lungs is determined. In various embodiments, the volume of the lungs may be determined using patient specific information. For example, the volume of an adult's lungs may be different than a volume of a child's lungs. Moreover, a volume of a woman's lungs may be different than a volume of a man's lungs. Accordingly, the lung volume determined at 114 and 134 is calculated based on the actual MR image data acquired for the specific patient being scanned. More specifically, the volume at 114 and 134 is not based on information acquired from patients different than the subject 16 being scanned. Rather, the volume of the lung is patient specific information obtained from the subject 16.

Figure 5:
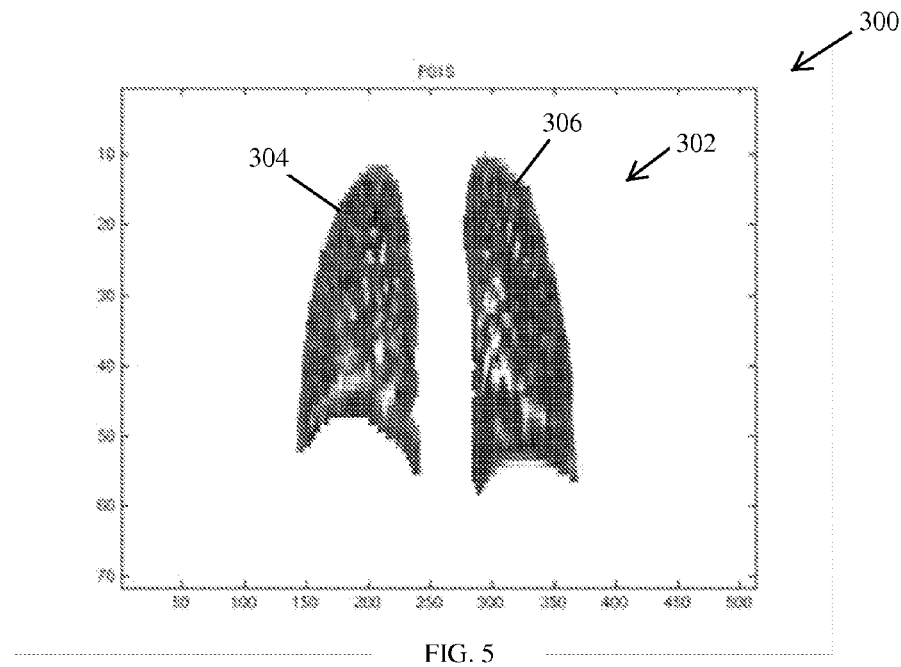
FIG. 5 is an exemplary image that may be generated in accordance with various embodiments.
Figure 6:
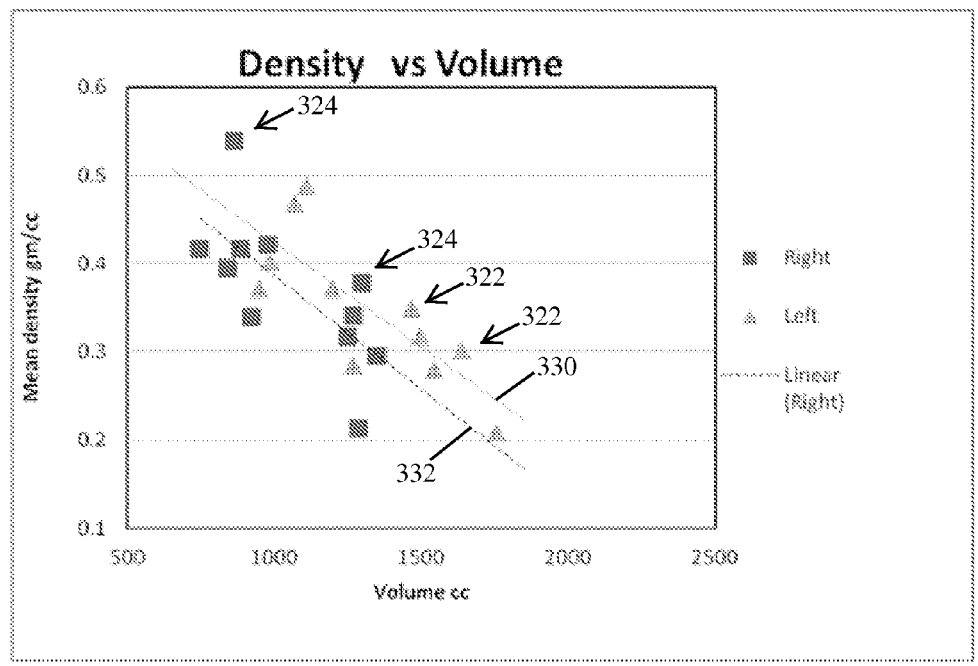
FIG. 6 is an exemplary graph that may be generated in accordance with various embodiments.

In various embodiments, the volume of the lungs may be determined using, for example, a model of the lungs. The model of the lungs may be generated based on the segmentation described above. The lung volume can be determined by summing all the data elements flagged as lung in the model multiplied by the volume represented by each data element. Accordingly, the module 50 may be determined to acquire various measurements of the lungs using the model to determine a volume of the lungs. Additionally, it should be realized that as described above, the volume of the lungs may be determined at a specific point in the respiratory cycle. More specifically, the volume of the lungs may be determined using the segmentation information acquired at 110 and 130. For example, as discussed above, the gates 220 each include emission data collected at a specific point in the respiratory cycle. Accordingly, at least one of the gates includes emission data collected at the end of inspiration and another gate includes emission data collected at the end of expiration. Accordingly, the gate having emission data collected at the end of inspiration, i.e. when the lungs are fully expanded, may be utilized to determine the volume of the lungs. The volume of the lungs may be determined by, for example, measuring a superior-inferior distance within the lung. The volume of the lungs may also be determined by performing an area measurement of an axial or oblique image or by generating contours of surface renderings of the segmented lungs. For example, FIG. 5 is an exemplary coronal image 300 of a pair of lungs 302 wherein the pair of lungs 302 have been separated into a left lung 304 and a right lung 306 based on the segmentation described above. In various embodiments, the mean density and the volume for each of the lungs 304 and 306 may be plotted using separate trend lines as shown in FIG. 6. More specifically, FIG. 6 illustrates an exemplary graph 320 wherein the x-axis represents a lung volume and the y-axis represents a lung density. As shown in FIG. 6, the volume and density of the left lung 304 is illustrated using a plurality of triangles 322. Moreover, the volume and density of the right lung 306 is illustrated using a plurality of squares 324.

Referring again to FIG. 2, at 116 and 136, of methods 100 and 120 respectively, the density of the lungs is estimated using the volume determined at 114 and 134. More specifically, assume that there is a substantially linear relationship between lung volume and lung density as shown using the plot lines 330 and 332 in FIG. 6. Accordingly, the lung density may be determined in accordance with Density=A+B×volume, where A and B are constants. In various other embodiments, the lung density may be determined using a look-up table (LUT), such as the LUT 74 (shown in FIG. 1). In various embodiments, the LUT 74 may include a plurality of lung density values that are tabulated based on a plurality of lung volumes acquired from different patients. More specifically, the module 50 may be configured to utilize the lung volume determined at 114 to locate a density value that is associated with the lung volume using the LUT 74. It should be realized that the LUT 74 may be indexed using other parameters, such as for example, whether the patient is an adult or child, whether the patient is a male or female, etc. The LUT 74 may be indexed using a combination of parameters such as for example patient sex, height weight, age or Body Mass Index. Accordingly, at 116 and 136, of methods 100 and 120 respectively, a lung density value is estimated.

The volume measured as lung may change with the MRI technical parameters and the segmentation parameters. For example, some combination of MRI technical parameters and segmentation parameters may render more of the vascular tree in the lung as soft tissue generating a smaller lung volume. The constants A and B and the indexing of the LUT 74 would be selected based on the known properties of the selected MRI technical parameters and the segmentation parameters.

Referring again to FIG. 2, at 156, of method 140, the density of the lungs is estimated using the gating phase information recorded during the data acquisition. More specifically, assume that there is a predetermined relationship between the phase of the respiratory signal and the density of the lungs. The LUT 74 may be indexed using the phase of the image to locate an estimated lung density.

Referring again to FIG. 2, at 118, 138, and 158 the estimated lung density is utilized to generate an attenuation correction map for attenuation correcting PET images such as the attenuation correction map 76 shown in FIG. 1. In various embodiments, the density value determined at 116, 136, and 156 is measured in grams/centimeter. Accordingly, to generate the attenuation correction map 76, the density value of the lungs D is multiplied by a linear attenuation coefficient constant for the tissue. In various embodiments, the linear attenuation coefficient constant for the lungs is determined based on a priori knowledge of the lungs and a second value that represents the energy level of the scanner utilized to acquire the emission data 60. More specifically, the estimated lung density determined at 116, 136, and 156 is multiplied by a value that represents the linear attenuation coefficient constant for the lungs at the energy level of the scanner utilized to acquire the emission data 60. The attenuation correction map 76 generated at 118, 138, and 158 is then utilized to revise the initial estimate based on the calculations performed above to generate a final linear attenuation coefficient or linear attenuation correction map for the lungs. It should be realized that the various methods described herein may be applied to any scanner, although the illustrated embodiment describes a 511 keV scanner. More specifically, the linear attenuation correction map for the lungs is based on the target energy of the imaging system being used to generate the emission data 60.

Described herein are methods and systems that utilize MR information to provide attenuation correction of PET images. More specifically, various embodiments identify the volume of an organ of interest and then utilize the volume to generate an attenuation correction map for the PET images. In operation, MR images are utilized to determine the volume and density of the lungs.

Figure 7:
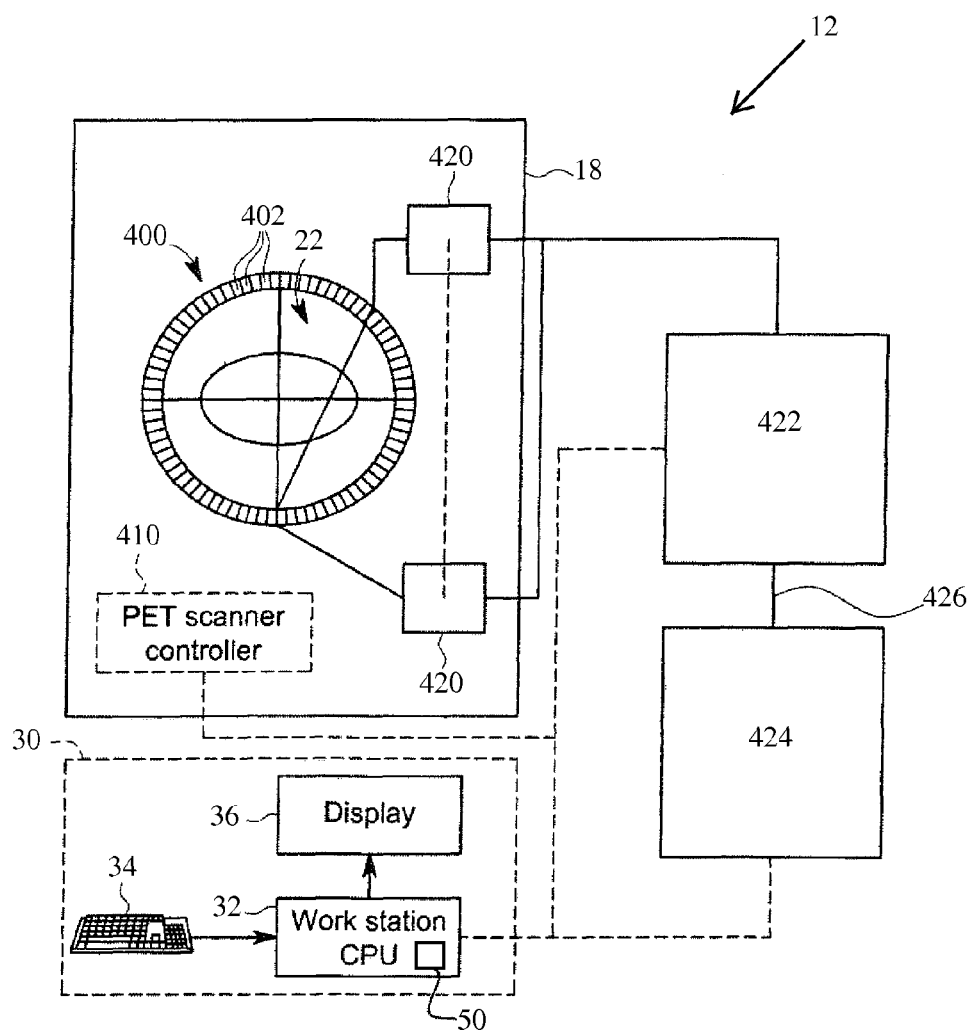
FIG. 7 is a block schematic diagram of the first modality unit shown in FIG. 1 in accordance with various embodiments.
Figure 8:
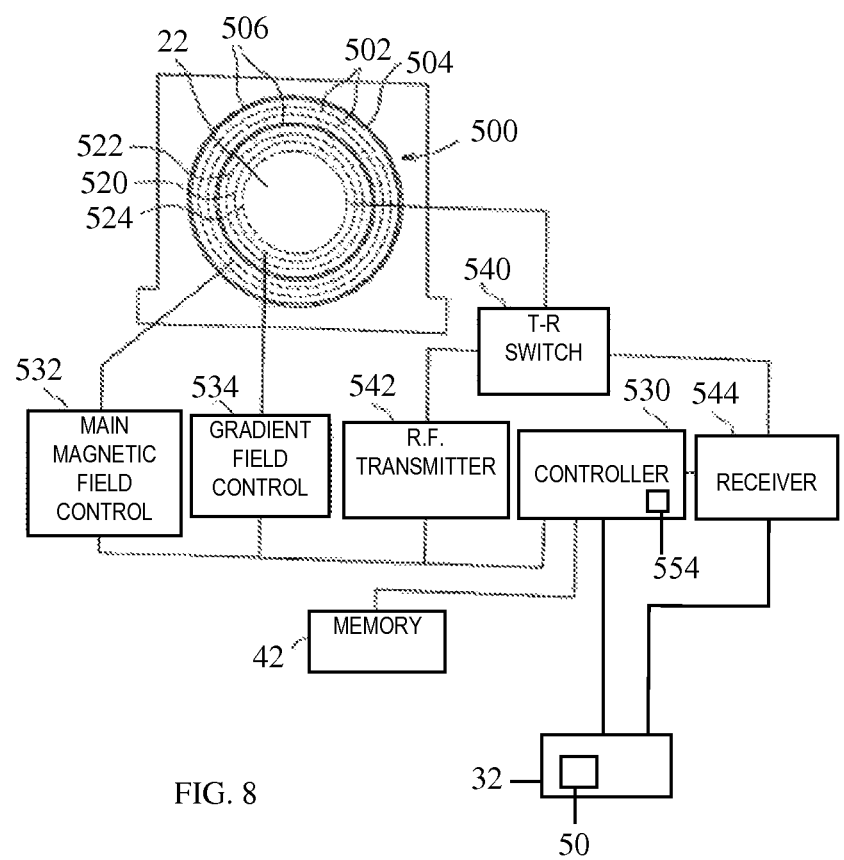
FIG. 8 is a block schematic diagram of the second modality unit shown in FIG. 1 in accordance with various embodiments.

Various embodiments of the methods described herein may be provided as part of, or used with, a medical imaging system, such as a dual-modality imaging system 10 as shown in FIG. 1. FIG. 7 is a block schematic diagram of the first modality unit 12, e.g. the PET imaging system, shown in FIG. 1. FIG. 8 is a block schematic diagram of the second modality unit 14, e.g. the MRI system, shown in FIG. 1.

As shown in FIG. 7, the PET system 12 includes a detector array 400 that is arranged as ring assembly of individual detector modules 402. The detector array 10 also includes the central opening 22, in which an object or patient, such as the subject 16 may be positioned, using, for example, the motorized table 24 (shown in FIG. 1). The motorized table 24 is aligned with the central axis of the detector array 400. During operation, the motorized table 24 moves the subject 16 into the central opening 22 of the detector array 400 in response to one or more commands received from the operator workstation 30. More specifically, a PET scanner controller 410 responds to the commands received from the operator workstation 30 through the communication link 32. Therefore, the scanning operation is controlled from the operator workstation 30 through PET scanner controller 410.

During operation, when a photon collides with a scintillator on the detector array 400, the photon collision produces a scintilla on the scintillator. The scintillator produces an analog signal that is transmitted to an electronics section (not shown) that may form part of the detector array 400. The electronics section outputs an analog signal when a scintillation event occurs. A set of acquisition circuits 420 is provided to receive these analog signals. The acquisition circuits 420 process the analog signals to identify each valid event and provide a set of digital numbers or values indicative of the identified event. For example, this information indicates when the event took place and the position of the scintillation scintillator that detected the event.

The digital signals are transmitted through a communication link, for example, a cable, to a data acquisition controller 422. The data acquisition processor 422 is adapted to perform the scatter correction and/or various other operations based on the received signals. The PET system 12 may also include an image reconstruction processor 424 that is interconnected via a communication link 426 to the data acquisition controller 422. During operation, the image reconstruction processor 424 performs various image enhancing techniques on the digital signals and generates an image of the subject 16.

As shown in FIG. 8, the MRI system 14 includes a superconducting magnet assembly 500 that includes a superconducting magnet 502. The superconducting magnet 502 is formed from a plurality of magnetic coils supported on a magnet coil support or coil former. In one embodiment, the superconducting magnet assembly 500 may also include a thermal shield 504. A vessel 506 (also referred to as a cryostat) surrounds the superconducting magnet 502, and the thermal shield 504 surrounds the vessel 506. The vessel 506 is typically filled with liquid helium to cool the coils of the superconducting magnet 502. A thermal insulation (not shown) may be provided surrounding the outer surface of the vessel 506. The MRI system 14 also includes a main gradient coil 520, a shield gradient coil 522, and an RF transmit coil 524. The MRI system 14 also generally includes a controller 530, a main magnetic field control 532, a gradient field control 534, the memory device 42, the display device 36, a transmit-receive (T-R) switch 540, an RF transmitter 542 and a receiver 544.

In operation, a body of an object, such as the subject 16 (shown in FIG. 1) is placed in the opening 22 on a suitable support, for example, the motorized table 24 (shown in FIG. 1). The superconducting magnet 502 produces a uniform and static main magnetic field $B_0$ across the opening 22. The strength of the electromagnetic field in the opening 22 and correspondingly in the patient, is controlled by the controller 530 via the main magnetic field control 532, which also controls a supply of energizing current to the superconducting magnet 502.

The main gradient coil 520, which may include one or more gradient coil elements, is provided so that a magnetic gradient can be imposed on the magnetic field $B_0$ in the opening 22 in any one or more of three orthogonal directions x, y, and z. The main gradient coil 520 is energized by the gradient field control 534 and is also controlled by the controller 530.

The RF coil assembly 524 is arranged to transmit magnetic pulses and/or optionally simultaneously detect MR signals from the patient, if receive coil elements are also provided. The RF coil assembly 524 may be selectably interconnected to one of the RF transmitter 542 or receiver 544, respectively, by the T-R switch 540. The RF transmitter 542 and T-R switch 540 are controlled by the controller 530 such that RF field pulses or signals are generated by the RF transmitter 542 and selectively applied to the patient for excitation of magnetic resonance in the patient.

Following application of the RF pulses, the T-R switch 540 is again actuated to decouple the RF coil assembly 524 from the RF transmitter 542. The detected MR signals are in turn communicated to the controller 530. The controller 530 may include a processor 554 that controls the processing of the MR signals to produce signals representative of an image of the subject 16. The processed signals representative of the image are also transmitted to the display device 36 to provide a visual display of the image. Specifically, the MR signals fill or form a k-space that is Fourier transformed to obtain a viewable image which may be viewed on the display device 36.

As used herein, a set of instructions may include various commands that instruct the computer or processor as a processing machine to perform specific operations such as the methods and processes of the various embodiments of the invention. The set of instructions may be in the form of a software program, which may form part of a tangible non-transitory computer readable medium or media. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" may include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal languages of the claims.

What is claimed is:

1. A method for generating a Positron Emission Tomography (PET) attenuation correction map, said method comprising:
    obtaining a Magnetic Resonance (MR) image dataset of a subject of interest;
    obtaining a PET emission dataset of the subject of interest;
    segmenting the MR image dataset to identify at least one object of interest;
    determining a volume of the object of interest;
    generating a PET attenuation correction map using the determined volume and an initial attenuation correction value;
    revising the initial attenuation correction value based on a density of the object of interest and the PET attenuation correction map, wherein the density is based on the volume of the object of interest; and
    regenerating the PET attenuation correction map based on a revised initial attenuation correction value.

2. The method of claim 1, wherein the object of interest is a pair of lungs of the subject of interest.

3. The method of claim 1, further comprising:
    using the volume of the object of interest to determine a density of the object of interest; and using the determined density to generate the PET attenuation correction map.

4. The method of claim 1, further comprising:
sorting the emission dataset into a plurality of gates using a respiratory signal;
identifying the gate that includes end inspiration emission data; and
determining the volume using the data in the identified gate.

5. The method of claim 1, wherein determining the volume of the object of interest further comprises:
estimating a density of the object of interest using the determined volume; and
using the estimated density to generate the PET attenuation correction map.

6. The method of claim 1, further comprising estimating the density of the object of interest using a look-up table.

7. The method of claim 6, wherein the object of interest is a pair of lungs, said method further comprising:
assigning the initial attenuation correction value to each of a plurality of clusters identified during the segmentation.

8. A medical imaging system comprising:
a Magnetic Resonance Imaging (MRI) system;
a Positron Emission Tomography (PET) imaging system; and
a computer coupled to the MRI system and the PET system, said computer being programmed to:
obtain a MR image dataset of a subject of interest;
obtain a PET emission dataset of the subject of interest;
segment the MR image dataset to identify at least one object of interest;
determine a volume of the object of interest;
generate a PET attenuation correction map using the determined volume and an initial attenuation correction value;
revising the initial attenuation correction value based on a density of the object of interest and the PET attenuation correction map, wherein the density is based on the volume of the object of interest; and
regenerating the PET attenuation correction map based on a revised initial attenuation correction value.

9. The medical imaging system of claim 8, wherein the object of interest is a pair of lungs.

10. The medical imaging system of claim 8, wherein the computer is further programmed to:
use the volume of the object of interest to determine a density of the object of interest; and
use the determined density to generate the PET attenuation correction map.

11. The medical imaging system of claim 8, wherein the computer is further programmed to:
sort the emission dataset into a plurality of gates using a respiratory signal;
identify the gate that includes end inspiration emission data; and
determine the volume using the data in the identified gate.

12. The medical imaging system of claim 8, wherein the computer is further programmed to:
estimate a density of the object of interest using the determined volume; and
use the estimated density to generate the PET attenuation correction map.

13. The medical imaging system of claim 8, wherein the computer is further programmed to estimating the density of the object of interest using a look-up table.

14. The medical imaging system of claim 8, wherein the object of interest is a pair of lungs, the computer is further programmed to:
assign the initial attenuation correction value to each cluster identified during the segmentation.

15. A non-transitory computer readable medium encoded with a program programmed to instruct a computer to:
obtain a Magnetic Resonance (MR) image dataset of a subject of interest;
obtain a Positron Emission Tomography (PET) emission dataset of the subject of interest;
segment the MR image dataset to identify at least one lung;
determine a volume of the lung;
generate a PET attenuation correction map using the determined volume and an initial attenuation correction value; and
revising the initial attenuation correction value based on a density of the object of interest and the PET attenuation correction map, wherein the density is based on the volume of the object of interest; and
regenerating the PET attenuation correction map based on a revised initial attenuation correction value.

16. The non-transitory computer readable medium of claim 15, wherein the program is further programmed to instruct the computer to
use the volume of the lung to determine a density of the lung; and
use the determined density to generate the PET attenuation correction map.

17. The non-transitory computer readable medium of claim 15, wherein the program is further programmed to instruct the computer to
sort the emission dataset into a plurality of gates using a respiratory signal;
identify the gate that includes end inspiration emission data; and
determine the volume of the lung using the identified gate.

18. The non-transitory computer readable medium of claim 15, wherein the program is further programmed to instruct the computer to
estimate a density of the lung using the determined volume; and
use the estimated density to generate the PET attenuation correction map.

19. The non-transitory computer readable medium of claim 15, wherein the program is further programmed to instruct the computer to estimating the density of the lung using a look-up table.

20. The non-transitory computer readable medium of claim 15, wherein the program is further programmed to instruct the computer to
assign the initial attenuation correction value to each cluster identified during the segmentation.

* * * * *